(12) United States Patent
Asakura et al.

(10) Patent No.: US 8,240,859 B2
(45) Date of Patent: Aug. 14, 2012

(54) ANTIGLARE FILM, ANTIREFLECTION FILM, POLARIZING PLATE AND IMAGE DISPLAY DEVICE

(75) Inventors: Tetsuya Asakura, Minami-Ashigara (JP); Daiki Wakizaka, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 305 days.

(21) Appl. No.: 12/567,300

(22) Filed: Sep. 25, 2009

(65) Prior Publication Data
US 2010/0079868 A1  Apr. 1, 2010

(30) Foreign Application Priority Data

Sep. 26, 2008 (JP) ................. P2008-249262

(51) Int. Cl.
*G02B 27/00* (2006.01)

(52) U.S. Cl. ........................... 359/601; 359/599

(58) Field of Classification Search ............ 359/588, 359/601–614, 831, 599
See application file for complete search history.

(56) References Cited

U.S. PATENT DOCUMENTS

| 2007/0042173 A1* | 2/2007 | Nagaoka et al. ........... 428/313.9 |
| 2007/0121211 A1 | 5/2007 | Watanabe et al. |
| 2008/0174875 A1* | 7/2008 | Iwata et al. .................... 359/599 |

FOREIGN PATENT DOCUMENTS

| JP | 08-309910 | 11/1996 |
| JP | 2005-309399 A | 11/2005 |
| JP | 2007-108724 A | 4/2007 |

OTHER PUBLICATIONS

Japanese Office Action issued in Japanese Patent Application No. 2006-249262 on Mar. 21, 2012, with English translation.

* cited by examiner

*Primary Examiner* — Thong Nguyen
(74) *Attorney, Agent, or Firm* — Birch, Stewart, Kolasch & Birch, LLP (57) ABSTRACT

An antiglare film is provided and includes: a transparent support; and an antiglare layer containing a binder and a light-transmitting fine particle. The light-transmitting fine particle has an average particle diameter of 3 to 15 μm, the antiglare layer has an average thickness smaller than the average particle diameter of the light-transmitting fine particle by 0.1 to 2.0 μm, the antiglare layer contains the light-transmitting fine particle in an amount of 1.0 to 3.0 weight % based on all solid contents of the antiglare layer. The antiglare layer has a surface having a $\theta(1)$ of 60 to 98.5%, wherein the $\theta(1)$ is a ratio of a surface region of $0° \leq \theta \leq 1°$ in the surface when $\theta$ represents a tilt angle of an irregularity on the surface.

16 Claims, 2 Drawing Sheets

ANTIGLARE FILM, ANTIREFLECTION FILM, POLARIZING PLATE AND IMAGE DISPLAY DEVICE

This application is based on and claims priority under 35 U.S.C. §119 from Japanese Patent Application No. 2008-249262 filed Sep. 26, 2008, the entire disclosure of which is herein incorporated by reference.

BACKGROUND OF THE INVENTION

1. Field of the Invention

The present invention relates to an antiglare film, an antireflection film, a polarizing plate and an image display device.

2. Description of Related Art

In various image display devices such as liquid crystal display device (LCD), plasma display panel (PDP), electroluminescent display (ELD) and cathode ray tube display device (CRT), an antiglare film or an antiglare antireflection film is used on the display surface so as to prevent reduction in the contrast due to reflection of outside light or disturbing reflection of an image. With widespread usage of the image display device in an office or household environment, it is required to enhance the antiglare property of preventing a fluorescent lamp in room or the viewer's figure from causing disturbing reflection on the display surface and more improve the display contrast in a bright place.

The antiglare film that is inexpensive and capable of mass production includes an antiglare film obtained by coating a resin containing a light-transmitting fine particle on a surface of a transparent substrate film to form an antiglare layer. However, the light-transmitting fine particle contains a coarse particle attributable to the particle production, and the coarse particle disadvantageously becomes a point defect at the production of an antiglare film and decreases the production yield of the antiglare film. Accordingly, for removing the coarse particle with good precision, a method of previously performing a filtration treatment of the light-transmitting fine particle in an emulsion state or liquid dispersion state has been developed (see, for example, JP-A-2005-309399).

However, the previous filtration treatment of the light-transmitting fine particle makes it difficult to produce an antiglare film that is inexpensive and capable of mass production, because the light-transmitting particle is very expensive and the productivity of the light-transmitting fine particle decreases.

Also, for preventing disturbing reflection of outside light, an antireflection film having an antireflection layer on the antiglare layer of the antiglare film is generally used. The antireflection film has an action of reducing the reflectance by using the principle of optical interference so as to prevent the reduction of contrast due to reflection of outside light or disturbing reflection of an image and is disposed on the outermost surface of a display. Furthermore, the disturbing reflection of outside light can also be suppressed by the effect of surface scattering by providing appropriate irregularities on the surface of the antireflection film.

However, when an antireflection layer is tried to be coated on the irregular surface of the antiglare layer, coating unevenness attributable to irregularities or repelling attributable to the coarse particle is generated, failing in obtaining a uniform thickness, and optimal light interference as designed is not brought about, as a result, the reflectance may not be decreased. For this reason, it has been difficult to satisfy both low reflection and antiglare property.

SUMMARY OF THE INVENTION

An object of the present invention is to provide an antiglare film free from a point defect due to a coarse particle and assured of good production yield, and an antireflection film obtained by providing an antireflection layer on the antiglare film.

Another object of the present invention is to provide an antireflection film ensuring not only little disturbing reflection of outside light and excellent denseness of black but also excellent uniformity of thickness and very low reflectance. Another object of the present invention is to provide a polarizing plate and an image display device, each containing the antiglare film or the antireflection film.

As a result of intensive studies, the present inventors have found that the above-described objects can be attained by the following means.

1. An antiglare film comprising:
    a transparent support; and
    an antiglare layer containing a binder and light-transmitting fine particle,
    wherein
    the light-transmitting fine particle has an average particle diameter of 3 to 15 µm,
    the antiglare layer has an average thickness smaller than the average particle diameter of the light-transmitting fine particle by 0.1 to 2.0 µm,
    the antiglare layer contains the light-transmitting fine particle in an amount of 1.0 to 3.0 weight % based on all solid contents of the antiglare layer, and
    the antiglare layer has a surface having a θ(1) of 60 to 98.5%, wherein the θ(1) is a ratio of a surface region of $0° \leq \theta \leq 1°$ in the surface when θ represents a tilt angle of an irregularity on the surface.

2. The antiglare film as described in item 1, wherein the surface of the antiglare layer has irregularities having an average distance Sm of 0.03 mm<Sm<0.5 mm.

3. The antiglare film as described in item 1 or 2, wherein the surface of the antiglare layer has a 10-point average roughness Rz of 0.2 µm<Rz<2.0 µm.

4. The antiglare film as described in any one of items 1 to 3, wherein the antiglare layer contains a leveling agent of a fluorine-containing compound or a silicone compound.

5. An antireflection film comprising:
    an antiglare film as described in any one of items 1 to 4; and
    a low refractive index layer having a refractive index lower than the antiglare layer.

6. The antireflection film as described in item 5, wherein the low refractive index layer contains a hollow silica particle.

7. The antireflection film as described in item 5 or 6, further comprising a high refractive index layer having a refractive index higher than both the antiglare layer and the low refractive index layer, the high refractive index layer being between the antiglare layer and the low refractive index layer.

8. The antireflection film as described in item 7, wherein the high refractive index layer contains an oxide fine particle of at least one metal selected from the group consisting of Si, Al, Ti, Zr, Sb, Zn, Sn and In.

9. The antireflection film as described in item 8, wherein the high refractive index layer contains the oxide fine particle in an amount of 30 weight % or more based on all solid contents of the high refractive index layer.

10. The antireflection film as described in any one of items 7 to 9, wherein the high refractive index layer contains a leveling agent of a fluorine-containing compound or a silicone compound.

11. The antireflection film as described in any one of items 7 to 10, further comprising a medium refractive index layer having a refractive index layer higher than the antiglare layer and lower than the high refractive index layer, the medium refractive index layer being between the antiglare layer and the high refractive index layer.

12. The antireflection film as described in item 11, wherein the medium refractive index layer contains an oxide fine particle of at least one metal selected from the group consisting of Si, Al, Ti, Zr, Sb, Zn, Sn and In.

13. The antireflection film as described in item 12, wherein the medium refractive index layer contains the oxide fine particle in an amount of 30 weight % or more based on all solid contents of the medium refractive index layer.

14. The antireflection film as described in any one of items 11 to 13, wherein the medium refractive index layer contains a leveling agent of a fluorine-containing compound or a silicone compound.

15. A polarizing plate comprising: a polarizer; and protective films on respective sides of the polarizer, wherein at least one of the protective films is an antiglare film as described in any one of items 1 to 4 or an antireflection film as described in any one of items 5 to 14.

16. An image display device comprising an antiglare film as described in any one of items 1 to 4, an antireflection film as described in any one of items 5 to 14, or a polarzing plate as describe in item 15 on an image display surface thereof.

BRIEF DESCRIPTION OF THE DRAWINGS

The features of the invention will appear more fully upon consideration of the exemplary embodiments of the inventions, which are schematically set forth in the drawings, in which:

In FIGS. 2-4 the reference numerals refer to the following:
1: Support
2: Antiglare layer
3: Medium refractive index layer
4: High refractive index layer
5: Low refractive index layer

DETAILED DESCRIPTION OF THE EXEMPLARY EMBODIMENTS

According to an exemplary embodiment of the present invention, an antiglare film making it very difficult to visually perceive a point defect due to a coarse particle can be provided even without using a particle reduced in the proportion of a coarse particle by performing a special treatment of the light-transmitting fine particle. In turn, an inexpensive particle with high productivity can be used, and an antiglare film that is inexpensive and capable of mass production can be produced.

When two or more antireflection layers (optical interference layers (at least two layers of a low refractive index layer, a high refractive index layer and a medium reflective index layer, each having a thickness of 50 to 200 nm)) formed from a coating composition are stacked on the conventionally known antiglare layer, even if precise coating is performed, the coating thickness is fluctuated and because of two or more layers, the fluctuation of the thickness becomes greater. Also, when the frequency of protrusions of the antiglare layer is large, even if an optical interference layer is coated, the optical interference layer that is a thin layer follows the protrusions and it becomes difficult to form an optical interference layer. Furthermore, repelling readily occurs due to a point defect by a coarse particle. Fluctuation of the coating thickness is present because of the reason described above and a difference appears in the optical interference action, as a result, the obtained antireflection film may fail in reducing the reflectance.

However, in the antiglare layer of the present invention, a flat region and a peak region are distributed and therefore, not only coating unevenness attributable to irregularities is scarcely caused but also since a point defect is hardly visible, repelling is unlikely to occur. The interference layer formed from a coating composition is coated to a uniform thickness and therefore, optimal light interference is brought about to decrease the reflectance. That is, an antireflection film ensuring little disturbing reflection of outside light and excellent denseness of black is obtained.

The present invention is described in detail below. Incidentally, the expression "from (numerical value 1) to (numerical value 2)" as used in the present invention for indicating a physical value, a characteristic value or the like means "(numerical value 1) or more and (numerical value 2) or less". Also, the term "(meth)acrylate" as used in the present invention means "at least either acrylate or methacrylate". The same applies to "(meth)acrylic acid" and the like.

(Layer Construction of Antiglare Film)

An antiglare film according to an exemplary embodiment of the present invention includes: a transparent support; and an antiglare layer containing a binder and light-transmitting fine particles. The light-transmitting fine particles have an average particle diameter of 3 to 15 µm, the antiglare layer has an average thickness smaller than the average particle diameter of the light-transmitting fine particle by 0.1 to 2.0 µm, the antiglare layer contains the light-transmitting fine particles in an amount of 1.0 to 3.0 weight % (or mass %) based on all solid contents of the antiglare layer, and the antiglare layer has a surface having a θ(1) of 60 to 98.5%, wherein the θ(1) is a ratio of a surface region of 0°≦θ≦1° in the surface when θ represents a tilt angle of an irregularity (one protrusion) on the surface.

An antiglare film of the present invention has at least one antiglare layer on a transparent support. The antiglare layer may be composed of one layer or a plurality of layers, for example, from 2 to 4 layers.

Examples of the layer construction preferred as an antiglare film of the present invention or as an optical film such as an antireflection film including the antiglare film are set forth below. In the following constructions, the substrate film indicates a transparent support composed of a film.

Substrate film/antiglare layer
Substrate film/antistatic layer/antiglare layer
Substrate film/antiglare layer/low refractive index layer
Substrate film/antiglare layer/antistatic layer/low refractive index layer
Substrate film/hardcoat layer/antiglare layer/low refractive index layer
Substrate film/hardcoat layer/antiglare layer/antistatic layer/low refractive index layer
Substrate film/hardcoat layer/antistatic layer/antiglare layer/low refractive index layer
Substrate film/antiglare layer/high refractive index layer/low refractive index layer
Substrate film/antiglare layer/medium refractive index layer/high refractive index layer/low refractive index layer Antistatic layer/substrate film/antiglare layer/medium refractive index layer/high refractive index layer/low refractive index layer Substrate film/antistatic layer/antiglare layer/medium refractive index layer/high refractive index layer/low refractive index layer Antistatic layer/substrate film/antiglare layer/high refractive index layer/low refractive index layer/high refractive index layer/low refractive index layer In the antiglare film of the present invention, a layer other than the antiglare layer may be provided by coating. Examples of such a layer include a hardcoat layer, an antistatic layer, a low refractive index layer and an antifouling layer. The antiglare layer preferably has all the functions of a hardcoat layer, an antistatic layer, an antifouling layer and the like. By having these layers, the antiglare film of the present invention can be suitably used as an optical film.

In the present invention, in view of low reflection, an antireflection film having a construction containing a medium refractive index layer/a high refractive index layer/a low refractive index layer is preferred, and examples thereof include the constructions described in JP-A-8-122504, JP-A-8-110401, JP-A-10-300902, JP-A-2002-243906 and JP-A-2000-111706. In terms of simple production and high productivity, exemplary embodiments of the present invention are an antiglare film having a single-layer antiglare layer on a support and an antireflection film having a single-layer antiglare layer and a single-layer low refractive index layer in this order on a support.

(Construction of Antiglare Layer)

An antiglare layer of the present invention is a layer where the average particle diameter of the light-transmitting fine particle is from 3 to 15 μm, the average thickness of the antiglare layer is smaller than the average particle diameter of the light-transmitting fine particles by 0.1 to 2.0 μm, the antiglare layer contains the light-transmitting fine particle in an amount of 1.0 to 3.0 weight % based on all solid contents forming the antiglare layer.

The coating solution for forming the antiglare layer contains, for example, main monomers for a matrix-forming binder, which are raw materials of a light-transmitting polymer formed by curing with ionizing radiation or the like, a light-transmitting fine particle described above having a specific particle diameter, and a polymerization initiator, and preferably contains a polymer compound for adjusting the viscosity of the coating solution, an inorganic filler for reducing curling or adjusting the reflective index or for other purposes, a coating aid, a leveling agent and the like.

The thickness of the antiglare layer is preferably from 2 to 14.9 μm, more preferably from 4 to 10 μm, still more preferably from 4.5 to 7.5 μm. If the thickness is less than 2 μm, the antiglare film lacks hardness, whereas if it exceeds 14.9 μm, the antiglare film undergoes serious curling and is deteriorated in terms of film brittleness.

The average thickness of the antiglare layer is an average value calculated by observing a cross-section of the antiglare film through an electron microscope and randomly measuring the thickness at 30 portions.

Here, the refractive index of the binder can be quantitatively evaluated, for example, by directly measuring the refractive index with an Abbe refractometer or by measuring a spectral reflection spectrum or a spectral ellipsometry. The refractive index of the light-transmitting fine particle is determined by dispersing fine particles in an equal amount in solvents prepared by changing the mixing ratio of two kinds of solvents differing in the refractive index and thereby varied in the refractive index, measuring the turbidity, and reading the refractive index of the solvent at a minimum turbidity by an Abbe refractometer.

(Light-Transmitting Fine Particle of Antiglare Layer)

In the present invention, the average thickness of the antiglare layer is preferably smaller than the average particle diameter of the light-transmitting fine particle dispersed in the antiglare layer by 0.1 to 2.0 μm, more preferably by 0.5 to 2.0 μm, still more preferably by 1.0 to 1.8 μm. If the difference between the thickness and the particle diameter is less than 0.1 μm, there arises a problem that a point defect becomes easily visible. This is presumed to occur because when the difference is less than 0.1 μm, a coarse particle (here, defined as a particle as large as 1.5 times or more the average particle diameter) causing a point defect is very large for the height of a protrusion in the normal part and the coarse particle is visually perceived as a point defect. If the difference exceeds 2.0 μm, the irregular surface are excessively large and therefore, coating of an antireflection layer may suffer from generation of coating unevenness or repelling due to irregularities or failure in obtaining a uniform thickness, giving rise to no occurrence of optimal light interference as designed and in turn, no reduction of the reflectance.

In the present invention, the average particle diameter of the light-transmitting fine particle dispersed in the antiglare layer is preferably from 3 to 15 μm, more preferably from 5 to 10 μm, still more preferably from 6 to 8 μm. If the average particle diameter is less than 3 μm, the layer to which the light-transmitting fine particle is added needs to be formed to a small thickness and the film disadvantageously lacks the hardness, whereas if it exceeds 15 μm, the layer to which the light-transmitting fine particle is added needs to be formed to a large thickness and there arises a problem such as curling or rise of cost.

In the antiglare layer, one protrusion is preferably formed substantially by 5 or less light-transmitting fine particles, and the protrusion is more preferably formed substantially by one light-transmitting fine particle. The term "substantially" as used herein means that 90% or more of protrusions defined above satisfy the preferred embodiment. As for the light-transmitting fine particle, a light-transmitting particle having the above-described particle diameter and satisfying the later-described internal haze value of the antiglare layer is preferably used, but since the protrusion is preferably formed substantially by one light-transmitting fine particle, it is preferred to select a particle having good dispersibility.

The refractive index of the light-transmitting fine particle of the present invention is preferably from 1.46 to 1.65, more preferably from 1.47 to 1.60, still more preferably from 1.49 to 1.58.

Specific preferred examples of the light-transmitting fine particle of the present invention include a resin particle such as crosslinked polymethyl methacrylate particle, crosslinked methyl methacrylate-styrene copolymer particle, crosslinked methyl methacrylate-methyl acrylate copolymer particle, crosslinked acrylate-styrene copolymer particle, crosslinked polystyrene particle, crosslinked methyl methacrylate-crosslinked modified acrylate copolymer particle, melamine/formaldehyde resin particle and benzoguanamine/formaldehyde resin particle. Among these, a crosslinked polymethyl methacrylate particle and a crosslinked methyl methacrylate-styrene copolymer particle are preferred.

The additive amount of the light-transmitting fine particle is preferably from 1.0 to 3.0 parts by weight (or parts by mass), more preferably from 1.6 to 2.8 parts by weight, still more preferably from 1.9 to 2.8 parts by weight, and most preferably from 2.0 to 2.5 parts by weight, per 100 parts by weight of the antiglare layer. When the additive amount is 3.0 parts by weight or less, the density of irregularities can be made rough, so that the proportion of a flat part on the film surface can be increased and the antireflection film can be uniformly stacked. At this time, since the fine particle protrudes at least 0.1 to 2.0 µm from the antiglare layer and thereby exerts the antiglare property, even when the proportion of a flat part is large, the antiglare property is not impaired. Also, when the added amount of the light-transmitting fine particle is from 1.0 to 3.0 parts by weight, a point defect becomes hardly visible by virtue of two effects, that is, an appropriate irregular surface is obtained and the absolute number of coarse grains producing a point defect is small.

As for the light-transmitting fine particle of the present invention, one kind may be used or two or more kinds may be used in combination. In the case of using two or more kinds in combination, two or more kinds of light-transmitting fine particles preferably differ in the refractive index. These two kinds of light-transmitting fine particles may be either a resin particle or an inorganic fine particle. These two kinds of light-transmitting fine particles may be the same or different in the particle diameter with or from each other.

An embodiment where out of those two kinds of light-transmitting fine particles, one is lower in the refractive index than the light-transmitting resin and another is higher in the refractive index than the light-transmitting resin, is preferred. For example, out of those two kinds of light-transmitting fine particles, the refractive index of the high refractive index particle is preferably higher than that of the light-transmitting resin by 0.010 to 0.050, more preferably by 0.015 to 0.040, still more preferably by 0.010 to 0.030, and the refractive index of the particle on the low refractive index side is preferably lower than that of the light-transmitting resin by 0.010 to 0.050, more preferably by 0.015 to 0.040, still more preferably by 0.010 to 0.030. Thanks to the refractive index difference between particle A and particle B, it becomes easy to control the internal scattering and the surface profile.

As for the average particle diameter of the light-transmitting fine particle, in both cases where two or more particles are adjacently present in the coating film and where particles are independently present, the average particle diameter indicates a primary particle diameter. However, in the case where aggregating inorganic particles having a primary particle diameter of about 0.1 µm are dispersed in a coating solution as a secondary particle to a size satisfying the particle size of the present invention and then coated, the secondary particle size is used as the average particle diameter.

The shape of the light-transmitting fine particle for use in the present invention may be either truly spherical or amorphous. As for the particle size distribution, in view of the control of haze value and diffusion and the homogeneity of coated surface state, a monodisperse particle is preferred. For example, when a particle having a particle diameter larger than the average particle diameter by 33% or more is defined as a coarse particle, the percentage of this coarse particle in the number of all particles is preferably 1% or less, more preferably 0.8% or less, still more preferably 0.4% or less.

Also, for example, when a particle having a particle diameter smaller than the average particle diameter by 16% or more is defined as a microparticle, the percentage of the microparticle in the number of all particles is preferably 10% or less, more preferably 6% or less, still more preferably 4% or less. The particle having such a particle diameter distribution can be obtained by performing classification after a normal synthesis reaction, and when the number of classifications is increased or the level of classification is raised, a particle having a more preferred distribution can be obtained.

For the classification, a method such as air classification, centrifugal classification, precipitation classification, filtration classification and electrostatic classification is preferably used.

The particle size distribution of the particle is measured by a Coulter counter method, and the measured distribution is converted into a particle number distribution. The average particle diameter may be calculated from the obtained particle distribution or may be measured using a light-scattering method or an electron micrograph.

In the antiglare layer, a light-transmitting fine particle different from the above-described light-transmitting fine particle may be used in combination. Specific preferred examples of this light-transmitting fine particle include a resin particle such as crosslinked polymethyl methacrylate particle, crosslinked methyl methacrylate-styrene copolymer particle, crosslinked polystyrene particle, crosslinked methyl methacrylate-methyl acrylate copolymer particle, crosslinked acrylate-styrene copolymer particle, melamine/formaldehyde resin particle and benzoguanamine/formaldehyde resin particle. Among these, a crosslinked styrene particle, a crosslinked polymethyl methacrylate particle and a crosslinked methyl methacrylate-styrene copolymer particle are preferred. Also, a so-called surface-modified particle obtained by chemically binding a compound containing a fluorine atom, a silicon atom, a carboxyl group, a hydroxyl group, an amino group, a sulfonic acid group, a phosphoric acid group or the like to the surface of the resin particle above, or a particle obtained by binding a nano-size inorganic fine particle such as silica or zirconia to the surface, may be preferably used. Furthermore, an inorganic fine particle may also be used as the light-transmitting fine particle. Specific preferred examples of the inorganic fine particle include a silica particle and an alumina particle, with a silica particle being more preferred.

There is a case where the light-transmitting fine particle easily precipitates in the binder. In such a case, an inorganic filler may be added so as to prevent the precipitation. Incidentally, addition of an inorganic filler in a larger amount is effective in preventing precipitation of the light-transmitting fine particle but adversely affects the transparency of the coating film. Accordingly, it is preferred to contain an inorganic filler having a particle diameter of 0.5 µm or less to an extent of not impairing the transparency of the coating film, that is, in an amount of approximately less than 0.1 weight %.

Specific examples of the light-transmitting fine particle which can be used include a commercially available resin particle, such as Chemisnow MX300, MX600, MX675, RX0855, MX800, SX713L and MX1500H produced by Soken Chemical & Engineering Co., Ltd., and Techpolymer SSX108HXE, SSX108LXE, SSX-106TN, SSX-106FB and XX120S produced by Sekisui Plastics Co., Ltd.

In the antiglare film of the present invention, the haze value attributable to surface scattering is preferably from 0 to 10%, more preferably from 0.5 to 5%.

In the antiglare film of the present invention, the arithmetic mean roughness Ra in accordance with JIS-B0601 (1994) is preferably from 0.05 to 0.25 µm, more preferably from 0.07 to 0.20 µm, and most preferably from 0.08 to 0.18 µm. The average distance Sm between irregularities is preferably from 0.03 to 0.5 mm, more preferably from 0.04 to 0.3 mm, and most preferably from 0.06 to 0.2 mm. The 10-point average roughness Rz is preferably from 0.2 to 2.0 µm, more preferably from 0.25 to 1.6 µm, and most preferably from 0.3 to 1.3 µm.

In the present invention, $\theta(1)$ is a measure indicating the ratio of a region substantially free from irregularity peaks, that is, a flat region, in the antiglare layer, because the tilt angle θ of surface irregularities of the antiglare layer is a low angle of $0°\leq θ\leq 1°$. In the antiglare film of the present invention, the region where the tilt angle θ of irregularities on the antiglare layer surface is $0°\leq θ\leq 1°$ (θ(1): the percentage of the area occupied by the region of $0°\leq θ\leq 1°$ in the measurement area) preferably occupies from 60 to 98.5%, more preferably from 70 to 94%, still more preferably from 85 to 93%. If θ(1) exceeds 98.5%, the film does not have an antiglare film and disturbing reflection of a fluorescent lamp or the like is distinct and is glaring and annoying. In addition, a point defect by a coarse particle is conspicuous and becomes a problem. If it is less than 60%, when the antiglare film is disposed on the outermost surface of a display and the display is displayed in black, there arises a problem of white brownish tint.

The distribution of the tilt angle θ is determined by the following method. Assuming that the apex of a triangle having an area of 0.5 to 2 square micrometers is the transparent film substrate plane (support plane), the angle θ between the normal line of a triangular plane formed by connecting three points at which three perpendicular lines upward vertically extended from those apexes intersect with the film surface, and a perpendicular line upward vertically extending from the support is defined as the tilt angle on the surface, and the tilt angle distribution at all measurement points when an area of 250,000 square micrometers (0.25 square millimeter) or more on the substrate is divided into those triangles and measured, is examined.

Figure 1A:
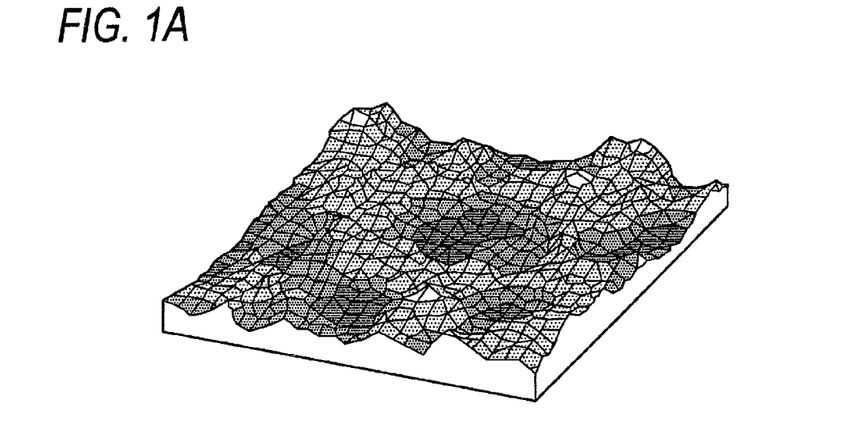
FIGS. 1A to 1C are schematic views for explaining the outline of the method for measuring the tilt angle.
Figure 1B:
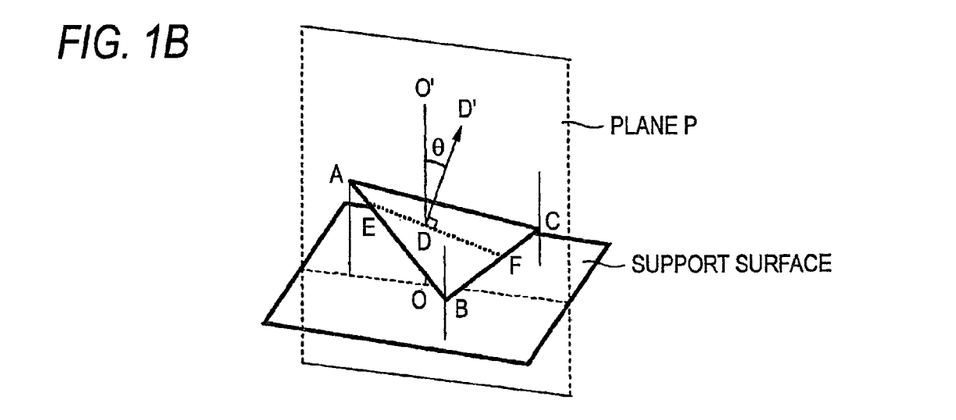
Figure 1C:
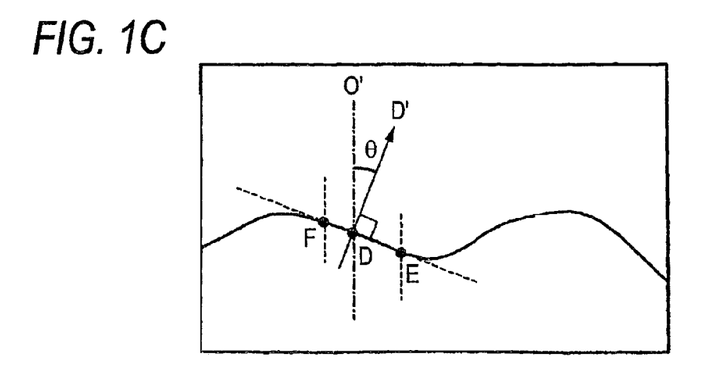
Figure 2:
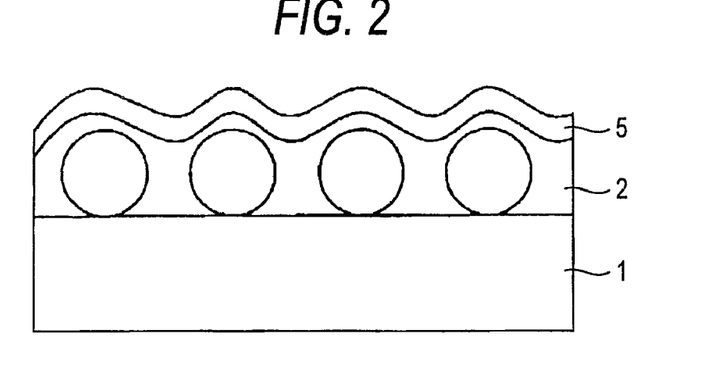
FIG. 2 is a schematic cross-sectional view schematically showing an exemplary embodiment of the present invention.
Figure 3:
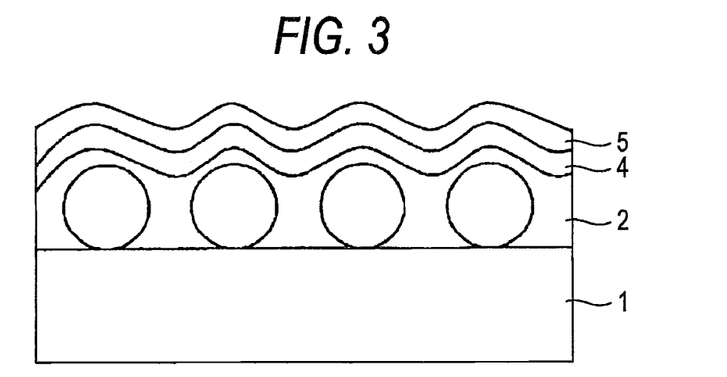
FIG. 3 is a schematic cross-sectional view schematically showing an exemplary embodiment of the present invention.
Figure 4:
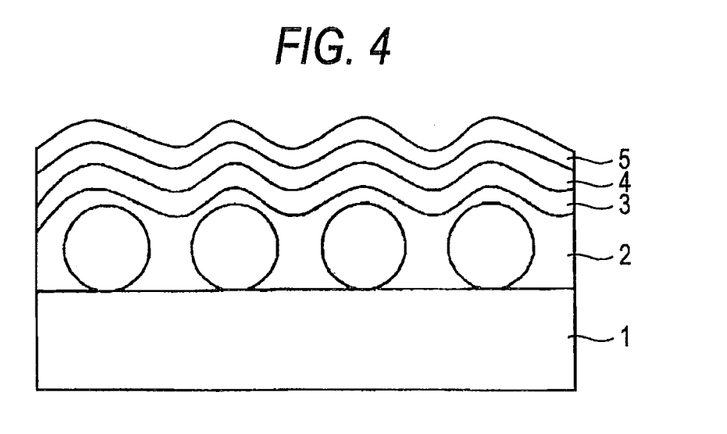
FIG. 4 is a schematic cross-sectional view schematically showing an exemplary embodiment of the present invention.

The method for measuring the tilt angle is described in detail by referring to FIGS. 1A to 1C. The film is divided into meshes having an area of 0.5 to 2 square micrometers on the support plane (see, FIG. 1A). FIG. 1B is a view where three points out of the divided meshes are extracted. Perpendicular lines are upward vertically extended from these three points on the support and the points where these three points intersect with the surface are designated as A, B and C. The angle θ between the normal line DD' of the triangular ABC plane and the perpendicular line OO' upward vertically extended from the support is defined as the tilt angle. FIG. 1C is a cross-sectional view of the film cut at a plane P containing the points O'DD'. The line segment EF is an intersection line between the triangle ABC and the plane P. The measurement area is preferably 250,000 square micrometers (0.25 square millimeters) or more on the support, and this plane is divided into triangles on the support and measured to determine the tilt angle. Some measuring devices are known, but one example is described here. The measurement using Model SXM520-AS150 manufactured by Micromap Corp. (U.S.A.) as the measuring device is described. For example, when the objective lens has a magnification of 10 times, the measuring unit of the tilt angle is 0.8 square micrometers and the measurement range is 500,000 square micrometers (0.5 square millimeters). When the magnification of the objective lens is increased, the measurement unit and the measurement range become small in proportion thereto. The measurement data are analyzed using a software such as MAT-LAB, whereby the tilt angle distribution can be calculated.

In the antiglare film of the present invention, by setting the surface roughness and tilt angle frequency to the ranges above, an antiglare film making it difficult to visually perceive a point defect and when an antireflection layer is coated, ensuing low reflectance and excellent denseness of black is obtained.

<Preparation of Light-Transmitting Fine Particle>

Examples of the production method of the light-transmitting fine particle for use in the present invention include a suspension polymerization method, an emulsion polymerization method, a soap-free emulsion polymerization method, a dispersion polymerization method and a seed polymerization method, and any of these production methods may be employed. These methods may be performed by referring to the methods described, for example, in Takayuki Ohtsu and Masaetsu Kinoshita, *Kobunshi Gosei no Jikken Ho* (*Experimental Technique for the Synthesis of Polymer*), page 130 and pages 146 to 147, Kagaku Dojin Sha, *Gosei Kobunshi* (*Synthetic Polymer*), Vol. 1, pp. 246-290, ibid., Vol. 3, pp. 1-108, Japanese Patents 2,543,503, 3,508,304, 2,746,275, 3,521,560 and 3,580,320, JP-A-10-1561, JP-A-7-2908, JP-A-5-297506 and JP-A-2002-145919.

<Polymer Binder for Matrix of Antiglare Layer>

The binder polymer for forming the matrix constituting the antiglare layer is not particularly limited but is preferably a light-transmitting binder polymer having a saturated hydrocarbon chain or polyether chain as the main chain after curing by ionizing radiation or the like. Also, the main binder polymer after curing preferably has a crosslinked structure.

In order to obtain the desired internal scattering, the refractive indexes of the light-transmitting fine particle and light-transmitting resin (matrix) are preferably adjusted. The absolute value of the refractive index difference between the light-transmitting fine particle and the light-transmitting resin is preferably from 0.001 to 0.050, more preferably from 0.015 to 0.040, and most preferably from 0.010 to 0.030.

The binder polymer having a saturated hydrocarbon chain as the main chain after curing is preferably an ethylenically unsaturated monomer selected from the compounds of the first group described below or a polymer thereof. Also, the polymer having a polyether chain as the main chain is preferably an epoxy-based monomer selected from the compounds of the second group described below or a polymer obtained by the ring-opening polymerization of such a monomer. A polymer composed of a mixture of these monomers is also preferred.

In the present invention, as regards the compound of the first group, the binder polymer having a saturated hydrocarbon chain as the main chain and at the same time, having a crosslinked structure is preferably a (co)polymer of a monomer having two or more ethylenically unsaturated groups. In order to raise the refractive index, the monomer preferably contains, in its structure, an aromatic ring or at least one atom selected from a halogen atom except for fluorine, a sulfur atom, a phosphorus atom and a nitrogen atom.

Examples of the monomer having two or more ethylenically unsaturated groups, which is used in the binder polymer for forming the antiglare layer, include an ester of polyhydric alcohol and (meth)acrylic acid {e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate}; vinylbenzene and a derivative thereof (e.g., 1,4-divinylbenzene, 2-acryloylethyl 4-vinylbenzoate, 1,4-divinylcyclohexanone); a vinylsulfone (e.g., divinylsulfone); and a (meth)acrylamide (e.g., methylenebisacrylamide).

As regards the compound of the second group, examples of the resin having two or more ethylenically unsaturated groups include a resin having a relatively low molecular weight, such as polyester resin, polyether resin, acrylic resin, epoxy resin, urethane resin, alkyd resin, spiroacetal resin, polybutadiene resin and polythiol polyene resin, and an oligomer or prepolymer of a polyfunctional compound such as polyhydric alcohol. Two or more kinds of these compounds may be used in combination. The resin having two or more ethylenically unsaturated groups is preferably contained in an amount of 10 to 100% based on the total amount of the binder.

The polymerization of such a monomer having ethylenically unsaturated groups can be performed by ionizing radiation or heating in the presence of a radical photopolymerization initiator or a radical thermal polymerization initiator. Accordingly, a coating solution containing the monomer having ethylenically unsaturated groups, a radical photopolymerization initiator or radical thermal polymerization initiator and the particle and further containing, if desired, an inorganic filler, a coating aid, other additives, an organic solvent and the like, is prepared, and the coating solution is coated on a transparent support and cured by a polymerization reaction under ionizing radiation or heating to form an antiglare layer. It is also preferred to perform the polymerization by using ionizing radiation curing and heat curing in combination. As for the photopolymerization or thermal polymerization initiator, a commercially available compound may be used, and such a compound is described, for example, in *Saishin UV Koka Gijutsu* (*Latest UV Curing Technology*), page 159, Kazuhiro Takausu (publisher), Technical Information Institute Co., Ltd. (publishing office) (1991), and catalogues of Ciba Specialty Chemicals Corp.

<Polymer Compound of Antiglare Layer>

The antiglare layer of the present invention may further contain a polymer compound. By the addition of a polymer compound, the curing shrinkage may be reduced or the viscosity of the coating solution may be adjusted.

The polymer compound has already formed a polymer at the time of addition to the coating solution, and examples of the polymer compound which is preferably used include cellulose esters (e.g., cellulose triacetate, cellulose diacetate, cellulose propionate, cellulose acetate propionate, cellulose acetate butyrate, cellulose nitrate), urethane acrylates, polyester acrylates, (meth)acrylic acid esters (e.g., methyl methacrylate/methyl (meth)acrylate copolymer, methyl methacrylate/ethyl (meth)acrylate copolymer, methyl methacrylate/butyl (meth)acylate copolymer, methyl methacrylate/styrene copolymer, methyl methacrylate/(meth)acrylic acid copolymer, polymethyl methacrylate), and resins such as polystyrene.

In view of the effect on curing shrinkage or the effect of increasing the viscosity of the coating solution, the polymer compound is preferably contained in an amount of 1 to 50 weight %, more preferably from 5 to 40 weight %, based on all binders contained in the layer containing the polymer compound. Also, the molecular weight of the polymer compound is, in terms of the weight average molecular weight, preferably from 3,000 to 400,000, more preferably from 5,000 to 300,000, still more preferably from 5,000 to 200,000.

<Inorganic Filler of Antiglare Layer>

In addition to the light-transmitting fine particle above, the antiglare layer of the present invention may contain an inorganic filler according to the purpose such as control of the refractive index, adjustment of the film strength, reduction of the curing shrinkage and, in the case of providing a low refractive index layer, decrease in the reflectance. It is also preferred to contain a high refractive index inorganic microfiller that is composed of an oxide containing at least one metal element selected from titanium, zirconium, aluminum, indium, zinc, tin and antimony and has an average primary particle diameter of generally 0.2 µm or less, preferably 0.1 µm or less, more preferably from 1 nm to 0.06 µm.

In the case where the refractive index of the matrix needs to be decreased to adjust the refractive index difference from the light-transmitting fine particle, a low refractive index inorganic microfiller such as silica fine particle or hollow silica fine particle may be used as the inorganic filler. The preferred particle diameter thereof is the same as that of the above-described high refractive index inorganic microfiller.

It is also preferred that the surface of the inorganic filler is subjected to a silane coupling treatment or a titanium coupling treatment. A surface-treating agent having a functional group capable of reacting with the binder species on the filler surface is preferably used.

Incidentally, the inorganic filler has a particle diameter sufficiently smaller than the light wavelength and therefore, causes no scattering, and a dispersion obtained by dispersing the filler in the binder polymer has a property as an optically uniform substance.

<Leveling Agent>

In the present invention, in order to ensure the surface state uniformity particularly in terms of coating unevenness, drying unevenness, point defect and the like, coating composition for an antiglare layer or other layers (e.g. a high refractive index layer or a medium refractive index layer) preferably contains either one or both of a fluorine-containing compound or a silicone compound, which are preferably a fluorine-containing surfactant and a silicone-containing surfactant, respectively. Above all, a fluorine-containing surfactant is preferably used, because an effect of improving a surface failure such as coating unevenness, drying unevenness and point defect in the film of the present invention is brought out with a smaller amount added. The purpose is to impart suitability for high-speed coating while elevating the surface state uniformity and thereby raise the productivity. Preferred examples of the fluorine-containing surfactant include the compounds described in JP-A-2007-188070, paragraphs [0049] to [0074].

The additive amount of the leveling agent (particularly a fluorine-containing polymer) for use in the present invention is preferably from 0.001 to 5 weight %, more preferably from 0.005 to 3 weight %, still more preferably from 0.01 to 1 weight %, based on the coating solution. When the amount of the surfactant added is 0.001 weight % or more, a sufficient effect can be obtained, and when the added amount is 5 weight % or less, drying of the coating film can be sufficiently effected and good performance as a coating film (for example, reflectance and scratch resistance) can be obtained.

<Organic Solvent of Coating Solution for Antiglare Layer>

An organic solvent can be added to the coating composition for forming the antiglare layer.

Examples of the organic solvent include an alcohol-based organic solvent such as methanol, ethanol, n-propanol, isopropanol, n-butanol, isobutanol, secondary butanol, tertiary butanol, isoamyl alcohol, 1-pentanol, n-hexanol and methyl amyl alcohol; a ketone-based organic solvent such as methyl isobutyl ketone, methyl ethyl ketone, diethyl ketone, acetone, cyclohexanone and diacetone alcohol; an ester-based organic solvent such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl acetate, methyl lactate and ethyl lactate; an ether- or acetal-based organic solvent such as 1,4-dioxane, tetrahydrofuran, 2-methylfuran, tetrahydropyrane and diethylacetal; a hydrocarbon-based organic solvent such as hexane, heptane, octane, isooctane, ligroin, cyclohexane, methylcyclohexane, toluene, xylene, ethylbenzene, styrene and divinylbenzene; a hydrocarbon halide-based organic solvent such as carbon tetrachloride, chloroform, methylene chloride, ethylene chloride, 1,1,1-trichloroethane, 1,1,2-trichloroethane, trichloroethylene, tetrachloroethylene and 1,1,1,2-tetrachloroethane; a polyhydric alcohol- or its derivative-based organic solvent such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerin monoacetate, glycerin ethers and 1,2,6-hexanetriol; a fatty acid-based organic solvent such as formic acid, acetic acid, propionic acid, butyric acid, isobutyric acid, isovaleric acid and lactic acid; a nitrogen compound-based organic solvent such as formamide, N,N-dimethylformamide, acetamide and acetonitrile; and a sulfur compound-based organic solvent such as dimethylsulfoxide.

Among these organic solvents, preferred are methyl isobutyl ketone, methyl ethyl ketone, cyclohexanone, acetone, toluene, xylene, ethyl acetate and 1-pentanol. Also, for the purpose of controlling the aggregating property, an alcohol-based or polyhydric alcohol-based solvent may be appropriately mixed and used. One of these organic solvents may be used alone or a mixture thereof may be used. In the coating composition, the organic solvent is preferably contained in an amount of, in terms of the total amount of organic solvents, from 20 to 90 weight %, more preferably from 30 to 80 weight %, and most preferably from 40 to 70 weight %. In order to stabilize the surface profile of the antiglare layer, a solvent having a boiling point of less than 100° C. and a solvent having a boiling point of 100° C. or more are preferably used in combination.

<Curing of Antiglare Layer>

The antiglare layer can be formed by applying the coating solution on a support and subjecting the coating to light irradiation, electron beam irradiation, heat treatment or the like to cause a crosslinking or polymerization reaction. In the case of ultraviolet irradiation, an ultraviolet ray emitted from a light source such as ultrahigh-pressure mercury lamp, high-pressure mercury lamp, low-pressure mercury lamp, carbon arc, xenon arc or metal halide lamp may be utilized. As for the curing with ultraviolet ray, the curing is preferably performed in an atmosphere adjusted to an oxygen concentration of 4 vol % or less, more preferably 2 vol % or less, and most preferably 0.5 vol % by volume or less, by nitrogen purging or the like.

Layers other than the antiglare layer are described below.

<Low Refractive Index Layer>

For reducing the reflectance, the antireflection film of the present invention may preferably have a low refractive index layer above the antiglare layer, the low refractive index layer has a refractive index lower than the antiglare layer. The refractive index of the low refractive index layer is preferably from 1.20 to 1.46, more preferably from 1.25 to 1.46, still more preferably from 1.30 to 1.40. The thickness of the low refractive index layer is preferably from 50 to 200 nm, more preferably from 70 to 100 nm. The haze of the low refractive index layer is preferably 3% or less, more preferably 2% or less, and most preferably 1% or less.

The low refractive index may preferably include a hollow silica particle.

Preferred embodiments of a curable composition for forming the low refractive index layer include:

(1) a composition containing a fluorine-containing compound having a crosslinking or polymerizable functional group;

(2) a composition with the main component being a hydrolysis condensate of a fluorine-containing organosilane material; and (3) a composition containing a monomer having two or more ethylenically unsaturated groups and an inorganic fine particle having a hollow structure.

(1) Composition Containing Fluorine-Containing Compound Having Crosslinking or Polymerizable Functional Group The fluorine-containing compound having a crosslinking or polymerizable functional group includes a copolymer of a fluorine-containing monomer with a monomer having a crosslinking or polymerizable functional group. Specific examples of the fluorine-containing polymer are described, for example, in JP-A-2003-222702 and JP-A-2003-183322.

As described in JP-A-2000-17028, a curing agent having a polymerizable unsaturated group may be appropriately used in combination with the above-described polymer. Also, as described in JP-A-2002-145952, a combination use with a fluorine-containing compound having a polyfunctional polymerizable unsaturated group is preferred. Examples of the compound having a polyfunctional polymerizable unsaturated group include the above-described monomers having two or more ethylenically unsaturated groups. Furthermore, a hydrolysis condensate of an organosilane described in JP-A-2004-170901 is also preferred, and a hydrolysis condensate of an organosilane containing a (meth)acryloyl group is more preferred. These compounds are preferred because a great effect is brought out on the scratch resistance by the combination use particularly when the polymerizable unsaturated group-containing compound is used in the polymer body.

In the case where the polymer used alone has no sufficient curability by itself, the necessary curability can be imparted by blending a crosslinking compound. For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound and a glycoluril-based compound. For the curing of such a compound, an organic acid or a salt thereof is preferably used.

(2) Composition with Main Component Being Hydrolysis Condensate of Fluorine-Containing Organosilane Material A composition with the main component being a hydrolysis condensate of a fluorine-containing organosilane compound is also preferred, because its refractive index is low and the hardness of the coating film surface is high. A condensate between a compound having hydrolyzable silanol at one end or both ends with respect to a fluorinated alkyl group and a tetraalkoxysilane is preferred. Specific examples of the composition are described in JP-A-2002-265866 and JP-A-2002-317152.

(3) Composition Containing Monomer Having Two or More Ethylenically Unsaturated Groups and Inorganic Fine Particle Having Hollow Structure A still another preferred embodiment is a low refractive index layer composed of a low refractive index particle and a binder. The low refractive index particle may be either organic or inorganic but is preferably a particle having a void in the inside (a hollow particle). Preferred examples of the hollow particle include a hollow silica particle. Specific examples of the hollow silica particle include silica-based particles described in JPA-2002-79616. The refractive index of the particle is preferably from 1.15 to 1.40, more preferably from 1.20 to 1.30. Examples of the binder include monomers having two or more ethylenically unsaturated groups, which are described above for the antiglare layer, or copolymers of perfluoroolefine and vinyl ethers or vinyl esters, described in JPA-2002-243907, JP-A-2002-372601, JP-A-2003-26732, JP-A-2003-222702, JP-A-2003-294911, JP-A-2003-329804, JP-A-2004-4444 and JP-A-2004-45462; and In the low refractive index layer of the present invention, a polymerization initiator described above for the antiglare layer is preferably added. In the case of containing a radical polymerizable compound, the polymerization initiator can be used in an amount of 1 to 10 parts by weight, preferably from 1 to 5 parts by weight, based on the compound.

In the low refractive index layer of the present invention, an inorganic particle can be used in combination. For imparting scratch resistance, a fine particle having a particle diameter of 15 to 150%, preferably from 30 to 100%, more preferably from 45 to 60%, of the thickness of the low refractive index layer may be used.

In the low refractive index layer of the present invention, a known polysiloxane-based or fluorine-based antifouling agent, a slipping agent and the like may be appropriately added for the purpose of imparting properties such as antifouling property, water resistance, chemical resistance and slipperiness.

Also, for the purpose of imparting scratch resistance or scratch resistance after chemical treatment, a compound having a polymerizable unsaturated bond described in JP-A-10-25388, JP-A-2000-17028 and JP-A-2002-145952 is preferably used in combination.

(High Refractive Index Layer, Medium Refractive Index Layer)

In the antireflection film of the present invention, for enhancing the antireflection property, a high refractive index layer having a refractive index higher than those of the antiglare layer and the low refractive index layer is preferably further provided between the antiglare layer and the low refractive index layer.

It is also preferred that a medium refractive index layer having a refractive index higher than that of the antiglare layer but lower than that of the high refractive index layer is further provided between the antiglare layer and the high refractive index layer.

In the present invention, these high refractive index layer and medium refractive index layer are sometimes collectively referred to as a high refractive index layer. Incidentally, in the present invention, the terms "high", "medium" and "low" in the high refractive index layer, medium refractive index layer and low refractive index indicate the relative size of refractive index among layers. In terms of the relationship with the support, the refractive index preferably satisfies the relationships of support>low refractive index layer, and high refractive index layer>support.

Also, in the present invention, the high refractive layer, medium refractive layer and low refractive index layer are sometimes collectively referred to as an antireflection layer.

In order to produce an antireflection film by forming a high refractive index layer and a low refractive index layer on the antiglare layer, the refractive index of the high refractive index layer is preferably from 1.53 to 2.30, more preferably from 1.55 to 2.00, still more preferably from 1.55 to 1.70.

In the case of producing an antireflection film by providing a medium refractive index layer, a high refractive index layer and a low refractive index layer in the order of increasing distance from the support, the refractive index of the high refractive index layer is preferably from 1.60 to 2.30, more preferably from 1.65 to 2.20. The refractive index of the medium refractive index layer is adjusted to a value between the refractive index of the low refractive index layer and the refractive index of the high refractive index layer. The refractive index of the medium refractive index layer is preferably from 1.55 to 1.80, more preferably from 1.60 to 1.70.

The high refractive index layer and medium refractive index layer for use in the present invention preferably contain an inorganic fine particle for adjusting the refractive index or obtaining good coatability on the antiglare layer. More specifically, the high refractive index layer and medium refractive index layer are preferably formed by dispersing an inorganic particle in a dispersion medium to obtain a liquid dispersion, preferably further adding a binder precursor necessary for matrix formation (for example, the later-described ionizing radiation-curable polyfunctional monomer or polyfunctional oligomer), a photopolymerization initiator and the like thereto, thereby preparing a coating solution for high refractive index layer or medium refractive index layer, then applying the coating composition for high refractive index layer or medium refractive index layer on a transparent support, and curing the coating through a crosslinking reaction or polymerization reaction of an ionizing radiation curable compound (for example, a polyfunctional monomer or a polyfunctional oligomer).

As for the binder precursor used in the high refractive index layer and medium refractive index layer, a compound having a polymerizable unsaturated bond described above (for the matrix-forming binder of the antiglare layer) may be preferably used. Two or more kinds of such compounds may be used in combination.

The binder precursor used in the high refractive index layer and medium refractive index layer is preferably added in an amount of 5 to 80 weight % based on the solid content in the coating composition for the layer.

The content of the inorganic fine particle in the high refractive index layer and medium refractive index layer is preferably 30 weight % or more, more preferably from 30 to 90 weight %, still more preferably from 40 to 80 weight %, yet still more preferably from 50 to 75 weight %, based on the entire solid content of the high refractive index layer or medium refractive index layer. Two or more kinds of inorganic fine particles may be used in combination in each layer.

In the high refractive index layer and medium refractive index layer, a binder precursor obtained by a crosslinking or polymerization reaction of an aromatic ring-containing ionizing radiation-curable compound, an ionizing radiation-curable compound containing a halogen element (e.g., Br, I, Cl) except for fluorine, an ionizing radiation-curable compound containing an atom such as S, N and P, or the like may also be preferably used.

The thickness of the high refractive index layer and medium refractive index layer may be appropriately designed according to the usage. In the case of using the high refractive index layer and medium refractive index layer as an optical interference layer, the thickness is preferably from 30 to 200 nm, more preferably from 50 to 170 nm, still more preferably from 60 to 150 nm.

In the case of not containing an antiglare function-imparting particle, the haze of the high refractive index layer and medium refractive index layer is preferably lower. The haze is preferably 5% or less, more preferably 3% or less, still more preferably 1% or less.

The high refractive index layer and medium refractive index layer are preferably formed on the support directly or through another layer.

(Inorganic Fine Particle)

In the present invention, various inorganic fine particles can be used for adjusting the refractive index, improving the thickness uniformity when coated on the antiglare layer, suppressing repelling, or enhancing physical properties such as hardness or optical properties such as reflectance and scattering property. The amount of the inorganic fine particle added to the high refractive index layer and medium refractive index layer is preferably 30 weight % or more, more preferably 40 weight % or more, and most preferably 50 weight % or more, based on the solid content of each layer. If the added amount of the inorganic fine particle is less than 30 weight %, repelling on the antiglare layer or worsening of thickness uniformity occurs and this is not preferred.

The inorganic fine particle is preferably an oxide of at least one metal selected from silicon, zirconium, titanium aluminum indium, zinc, tin and antimony, and specific examples thereof include $SiO_2$, $ZrO_2$, $TiO_2$, $Al_2O_3$, $In_2O_3$, ZnO, $SnO_2$, $Sb_2O_3$, ITO and ATO. That is, in the present invention, the high refractive index layer and medium refractive index layer preferably contain an oxide fine particle of at least one metal selected from Si, Al, Ti, Zr, Sb, Zn, Sn and In. In addition, $BaSO_4$, $CaCO_3$, talc, kaolin or the like may also be used as the inorganic fine particle.

In forming the high refractive index layer and medium refractive index layer, a cured product of a coating composition prepared by dispersing an inorganic fine particle having a high refractive particle, an initiator and an organic substituted silicon compound in a solvent together with the binder precursor is preferred.

In this case, from the standpoint of refractive index, above all, $ZrO_2$ and $TiO_2$ are preferably used as the inorganic fine particle The $TiO_2$ particle is preferably an inorganic particle including $TiO_2$ as the main component and containing at least one element selected from cobalt, aluminum and zirconium. The main component means a compound having a largest content (weight %) among the components constituting the particle.

The refractive index of the particle including $TiO_2$ as the main component for use in the present invention is preferably from 1.90 to 2.80, more preferably from 2.10 to 2.80, and most preferably from 2.20 to 2.80.

As for the crystal structure of the particle including $TiO_2$ as the main component, a rutile, rutile/anatase mixed crystal, anatase or amorphous structure is preferably the main component. In particular, a rutile structure is preferably the main component. The main component means a component having a largest content (weight %) among the components constituting the particle.

When the particle including $TiO_2$ as the main component contains at least one element selected from Co (cobalt), Al (aluminum) and Zr (zirconium), the photocatalytic activity of $TiO_2$ can be suppressed and the weather resistance of the film of the present invention can be improved.

The particularly preferred element is Co (cobalt). It is also preferred to use two or more kinds of elements in combination.

The inorganic particle including $TiO_2$ as the main component for use in the present invention may be surface-treated to have a core/shell structure as described in JP-A-2001-166104.

As for the particle diameter of the inorganic fine particle for use in the present invention, the inorganic fine particle is preferably dispersed to as small a particle diameter as possible in the dispersion medium, and the weight average molecular weight is from 1 to 200 nm, preferably from 5 to 150 nm, more preferably from 10 to 100 nm, still more preferably from 10 to 80 nm. By dispersing the inorganic fine particle to a small particle diameter of 100 nm or less, a film keeping the transparency can be formed. The particle diameter of the inorganic fine particle can be measured using a light-scattering method or an electron micrograph.

The specific surface of the inorganic fine particle is preferably from 10 to 400 $m^2/g$, more preferably from 20 to 200 $m^2/g$, and most preferably from 30 to 150 $m^2/g$.

In the coating solution for the formation of each layer, the inorganic fine particle for use in the present invention is preferably added as a dispersion in a dispersion medium.

The dispersion medium used for the inorganic fine particle is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol.

Above all, the dispersion medium is preferably methyl ethyl ketone, methyl isobutyl ketone or cyclohexanone.

The inorganic fine particle is dispersed using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. Also, a preliminary dispersion treatment may be performed. Examples of the disperser for use in the preliminary dispersion treatment include a ball mill, a three-roll mill, a kneader and an extruder.

(Electrically Conductive Particle)

In the antiglare film of the present invention, various electrically conductive particles may be used for imparting electrical conductivity.

The electrically conductive particle is preferably formed from an oxide or nitride of a metal. Examples of the metal oxide or nitride include tin oxide, indium oxide, zinc oxide and titanium nitride. Among these, tin oxide and indium oxide are preferred. The electrically conductive inorganic particle may include such a metal oxide or nitride as the main component and further contain other elements. The main component means a component having a largest content (weight %) among the components constituting the particle. Examples of the other elements include Ti, Zr, Sn, Sb, Cu, Fe, Mn, Pb, Cd, As, Cr, Hg, Zn, Al, Mg, Si, P, S, B, Nb, In, V and a halogen atom. In order to raise the electrical conductivity of tin oxide and indium oxide, Sb, P, B, Nb, In, V and a halogen atom are preferably added. Sb-containing tin oxide (ATO) and Sn-containing indium oxide (ITO) are particularly preferred. The proportion of Sb in ATO is preferably 3 to 20 weight %. The proportion of Sn in ITO is preferably 5 to 20 weight %.

The electrically conductive inorganic particle may be subjected to a surface treatment. The surface treatment is performed using an inorganic compound or an organic compound. Examples of the inorganic compound for use in the surface treatment include alumina and silica. A silica treatment is particularly preferred. Examples of the organic compound for use in the surface treatment include polyol, alkanolamine, stearic acid, a silane coupling agent and a titanate coupling agent. The silane coupling agent is most preferred. Two or more kinds of surface treatments may be performed in combination.

The shape of the electrically conductive inorganic particle is preferably a rice-grain shape, a spherical shape, a cubic shape, a spindle shape or an indefinite shape. Also, two or more kinds of electrically conductive inorganic particles may be used in combination in a specific layer or in the form of a film.

The electrically conductive inorganic particle can be used for the formation of an antistatic layer in the state of a dispersion.

(Dispersant)

In order to ensure the liquid dispersion stability of the inorganic fine particle and electrically conductive particle for use in the present invention or the film strength or the like after curing, a polyfunctional (meth)acrylate monomer and an anionic group-containing (meth)acrylate dispersant described, for example, in JP-A-11-153703 and U.S. Pat. No. 6,210,858 are preferably contained in the coating composition.

(Leveling Agent)

The above-described a fluorine-based or silicone-based leveling agent is preferably used in at least one layer of the high refractive index layer and the medium refractive index layer. By using a leveling agent in the high refractive index layer or medium refractive index layer of the present invention, non-uniformity of the thickness attributable to the surface irregularities of the antiglare layer or repelling of the coating can be improved. That is, in the present invention, the high refractive index layer preferably contains a leveling agent, or the medium refractive index layer preferably contains a leveling agent.

In the present invention, the integrated reflectance of the antireflection antiglare film in which a low refractive index layer and the like are provided is preferably 3.0% or less, more preferably 2.0% or less, and most preferably from 1.5 to 0.3%. By decreasing the integrated reflectance, a sufficient antiglare property is obtained even when the light scattering on the antiglare film surface is reduced, so that an antiglare antireflection film excellent in the denseness of black can be obtained.

<Transparent Support>

The transparent support for use in the antiglare film of the present invention is preferably a plastic film. Examples of the polymer forming the plastic film include a cellulose acylate (e.g., triacetyl cellulose, diacetyl cellulose; representatively, TAC-TD80U, TD80UF and the like produced by Fujifilm Corp.), a polyamide, a polycarbonate, a polyester (e.g., polyethylene terephthalate, polyethylene naphthalate), a polystyrene, a polyolefin, a norbornene-based resin (ARTON, trade name, produced by JSR Corp.), an amorphous polyolefin (ZEONEX, trade name, produced by Zeon Corp.), and a (meth)acrylic resin (ACRYPET VRL20A, trade name, produced by Mitsubishi Rayon Co., Ltd., and ring structure-containing acrylic resins described in JP-A-2004-70296 and JP-A-2006-171464). Among these, triacetyl cellulose, polyethylene terephthalate and polyethylene naphthalate are preferred, and triacetyl cellulose is more preferred.

In the case of using the antiglare film or the antireflection film of the present invention for a liquid crystal display device, the antiglare film is disposed on the outermost surface of the display, for example, by providing an adhesive layer on one surface. The antiglare film or the antireflection film of the present invention may be combined with a polarizing plate. In the case where the transparent support is triacetyl cellulose, since triacetyl cellulose is used as a protective film for protecting the polarizer of the polarizing plate, it is preferred in view of the cost to directly use the antiglare film or the antireflection film of the present invention for a protective film.

In the case where the antiglare film or the antireflection film of the present invention is disposed on the outermost surface of the display, for example, by providing an adhesive layer on one surface or is directly used as a polarizing plate protective film, for ensuring sufficient adhesion, the transparent substrate after forming the outermost layer is preferably subjected to a saponification treatment. The saponification treatment is performed by a known method, for example, by dipping the film in an alkali solution for an appropriate time. After the dipping in an alkali solution, the film is preferably thoroughly washed with water or dipped in a dilute acid to neutralize alkali components so as not to allow alkali components to remain in the film.

The surface of the transparent support on the side opposite the surface having the outermost layer is made hydrophilic by the saponification treatment.

<Coating Method>

The antiglare film or the antireflection film of the present invention can be formed by the following method, but the present invention is not limited to this method. First, a coating solution containing components for forming each layer is prepared. Next, the coating solution for forming various functional layers is coated on a transparent support by a dip coating method, an air knife coating method, a curtain coating method, a roller coating method, a wire bar coating method, a gravure coating method or a die coating method and then heated/dried. A microgravure coating method, a wire bar coating method and a die coating method (see, U.S. Pat. No. 2,681,294 and JP-A-2006-122889) are preferred, and a die coating method is more preferred.

Thereafter, the monomers for forming the functional layer are polymerized and cured by light irradiation or heating, whereby the functional layer is formed. Here, a plurality of functional layers may be provided, if desired.

Subsequently, when the antireflection film is manufactured, the coating solution for forming a low refractive index layer is coated on the functional layer and irradiated with light or heated in the same manner (that is, cured by irradiating ionizing radiation such as ultraviolet ray, preferably by irradiating ionizing radiation under heating) to form a low refractive index layer. In this way, the antiglare film or the antireflection film of the present invention is obtained.

<Polarizing Plate>

The polarizing plate is mainly composed of two protective films for protecting both surfaces on the front and back sides of a polarizer. The antiglare film or the antireflection of the present invention is preferably used for at least one of those two protective films sandwiching the polarizer from both surfaces. By using the antiglare film or the antireflection film of the present invention to serve also as a protective film, the production cost of the polarizing plate can be reduced. Also, by using the antiglare film of the present invention as the outermost layer, disturbing reflection or the like of outside light can be prevented and a polarizing plate excellent also in the scratch resistance, antifouling property and the like can be obtained.

The hydrophilized surface is effective particularly in improving the adhesion to a polarizer comprising polyvinyl alcohol as the main component. Also, the hydrophilized surface hardly allows attachment of dusts in the air and therefore, dusts scarcely intrude between the polarizer and the antiglare film when adhering the antiglare film to the polarizer, which is effective in preventing point defects due to dusts.

The saponification treatment is preferably performed such that the contact angle for water of the transparent substrate surface opposite the surface having the outermost layer becomes 40° or less, more preferably 30° or less, still more preferably 20° or less.

<Image Display Device>

The antiglare film of the present invention can be applied to an image display device such as liquid crystal display device (LCD), plasma display panel (PDP), electroluminescent display (ELD), cathode ray tube display (CRT) and surface-conduction electron-emitter display (SED). In particular, the antiglare film is preferably used for a liquid crystal display (LCD). The antiglare film of the present invention has a transparent support and therefore, is used by adhering the transparent support side to the image display surface of the image display device.

In the case of use as a surface protective film on one side of a polarizer, the antiglare film of the present invention can be preferably used for a transmissive, reflective or transflective liquid crystal display device in a mode such as twisted nematic (TN), super twisted nematic (STN), vertical alignment (VA), in-plane switching (IPS) and optically compensated bend cell (OCB).

EXAMPLES

The present invention is described in greater detail below by referring to Examples, but the present invention should not be construed as being limited thereto. Unless otherwise indicated, the "parts" and "%" are on the weight basis.

Example 1

(Preparation of Coating Solution for Antiglare Layer)

The coating solutions for antiglare layer used in this Example are set forth below.

Formulation of Coating Solution 1 for Antiglare Layer:

| PET-30 | 30.0 parts by weight |
| DPHA | 12.9 parts by weight |
| MX-150H | 0.9 parts by weight |
| IRGACURE 127 | 1.0 parts by weight |
| SP-13 | 0.08 parts by weight |
| Methyl isobutyl ketone | 40.0 parts by weight |
| Cyclohexanone | 15.0 parts by weight |

Formulation of Coating Solution 2 for Antiglare Layer:

| PET-30 | 48.4 parts by weight |
| MX-600 | 1.03 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 3 for Antiglare Layer:

| PET-30 | 48.4 parts by weight |
| MX-300 | 1.03 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 4 for Antiglare Layer:

| PET-30 | 48.4 parts by weight |
| MX-1500H | 1.03 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 5 for Antiglare Layer:

| PET-30 | 48.4 parts by weight |
| SSX108HLE | 1.03 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 6 for Antiglare Layer:

| PET-30 | 48.4 parts by weight |
| MX-2000 | 1.03 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 7 for Antiglare Layer:

| PET-30 | 48.4 parts by weight |
| SSX106FB | 0.025 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 8 for Antiglare Layer:

| PET-30 | 48.4 parts by weight |
| MX-600 | 0.51 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 9 for Antiglare Layer:

| PET-30 | 48.4 parts by weight |
| MX-600 | 1.28 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 10 for Antiglare Layer:

| PET-30 | 48.4 parts by weight |
| MX-600 | 2.08 parts by weight |

-continued

| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

Formulation of Coating Solution 11 for Antiglare Layer:

| PET-30 | 48.4 parts by weight |
| MX-600 | 0.64 parts by weight |
| SSX106FB | 0.64 parts by weight |
| IRGACURE 127 | 1.5 parts by weight |
| SP-13 | 0.1 parts by weight |
| Methyl isobutyl ketone | 30.0 parts by weight |
| Methyl ethyl ketone | 20.0 parts by weight |

The light-transmitting fine particle was formed into a 10 weight % methyl isobutyl ketone solution and dispersed by a polytron disperser at 10,000 rpm for 20 minutes to prepare a coating solution. The resulting coating solution was filtered through a polypropylene-made filter having a pore size of 30 µm to prepare Coating Solutions 1 to 11 for Antiglare Layer.

The compounds used are as follows.

DPHA:

A mixture of dipentaerythritol pentaacrylate and dipentaerythritol hexaacrylate (produced by Nippon Kayaku Co., Ltd.)

PET-30:

A mixture of pentaerythritol triacrylate and pentaerythritol tetraacrylate (produced by Nippon Kayaku Co., Ltd.)

IRGACURE 127:

A polymerization initiator (produced by Ciba Specialty Chemicals Corp.)

MX-150H:

A crosslinked polymethyl methacrylate fine particle having an average particle diameter of 1.5 µm, produced by Soken Chemical & Engineering Co.

MX-300:

A crosslinked polymethyl methacrylate fine particle having an average particle diameter of 3.0 µm, produced by Soken Chemical & Engineering Co.

MX-600:

A crosslinked polymethyl methacrylate fine particle having an average particle diameter of 6.0 µm, produced by Soken Chemical & Engineering Co.

MX-1500H:

A crosslinked polymethyl methacrylate fine particle having an average particle diameter of 15 µm, produced by Soken Chemical & Engineering Co.

MX-2000:

A crosslinked polymethyl methacrylate fine particle having an average particle diameter of 20 µm, produced by Soken Chemical & Engineering Co.

SSX108HLE:

A crosslinked polymethyl methacrylate fine particle having an average particle diameter of 8.0 µm, produced by Sekisui Plastics Co., Ltd.

SSX106FB:

A crosslinked acrylate-styrene copolymer fine particle having an average particle diameter of 6.0 µm, produced by Sekisui Plastics Co., Ltd.

SP-13: a fluorine-based leveling agent (Mw: 14,000)

$$-(CH_2-\underset{\underset{O\diagdown O-(CH_2)_2-(CF_2)_6-H}{\overset{\|}{C}}}{\overset{CH_3}{\underset{|}{C}}})_{90}-$$

$$-(CH_2-\underset{\underset{O\diagdown O\text{-}t\text{-}Bu}{\overset{\|}{C}}}{\overset{H}{\underset{|}{C}}})_{10}-$$

(Coating of Antiglare Layer 101)

A triacetyl cellulose film (TAC-TD80U, produced by Fujifilm Corp.) in a roll form was unrolled, and Coating Solution 1 for Antiglare Layer was directly extruded and coated thereon by using a coater having a throttle die under the condition of a conveying speed of 30 m/min and dried at 30° C. for 15 seconds and at 90° C. for 20 seconds. Thereafter, the coated layer was cured by irradiating an ultraviolet ray thereon at an irradiation dose of 90 mJ/cm$^2$ with use of an air-cooled metal halide lamp (manufactured by Eye Graphics Co., Ltd.) of 160 W/cm under nitrogen purging to form an antiglare layer having an antiglare property and an average thickness of 1.2 µm, and the resulting film was taken up. In this way, Antiglare Layer 101 was produced.

(Production of Antiglare Layers 102 to 110)

Antiglare Layers 102 to 110 were produced in the same manner as Antiglare Layer 101 except that in the production of Antiglare Layer 101, Coating Solution 1 for Antiglare Layer was changed to Coating Solutions 2 to 10 for Antiglare Layer and the average thickness was changed as shown in Table 1.

(Production of Antiglare Layers 111 to 113)

Antiglare Layers 111 to 113 were produced in the same manner as Antiglare Layer 101 except that in the production of Antiglare Layer 101, Coating Solution 1 for Antiglare Layer was changed to Coating Solution 2 for Antiglare Layer and the coated amount was changed to give an average thickness of 3.0 µm, 6.0 µm and 11.0 µm.

(Production of Antiglare Layer 114)

Antiglare Layer 114 was produced in the same manner as Antiglare Layer 101 except that in the production of Antiglare Layer 101, Coating Solution 1 for Antiglare Layer was changed to Coating Solution 11 for Antiglare Layer and the coated amount was changed to give an average thickness of 4.7 µm.

(Evaluation of Antiglare Film)

Various properties of the antiglare film were evaluated by the following methods. The results are shown in Table 1.

(Evaluation of Surface Profile)

The arithmetic mean roughness (Ra) of surface roughness, the average distance (Sm) between irregularities and the 10-point average roughness (Rz) of Antiglare Layers 101 to 114 were measured using a stylus-type surface roughness meter "SURFCORDER SE3500" {manufactured by Kosaka Laboratory Ltd.} set in accordance with JIS-B0601 (1994), and the values derived from the surface roughness meter were employed.

(Measurement of θ(1))

The tilt angle θ of Antiglare Layers 101 to 114 were measured using Model SXM520N-AS150 manufactured by Micromap Corp. (U.S.A.) with an objective lens of 10 magnification and a CCD camera KP-MIU manufactured by Hitachi Denshi Ltd. in the measurement range of 816 µm×618 µm at a measurement wavelength of 560 nm in a measurement mode of WAVE. The measured data were analyzed using MAT-LAB, and the θ(1) was determined by calculating the tilt angle.

(Evaluation of Point Defect by Coarse Particle)

In the antiglare film produced, point defects by a coarse grain were counted in transmitted light with an eye in a range of 1.34 m×5.00 m.

A: Two point defects or less.

B: Three point defects or more.

(Disturbing Reflection)

The back surface of Antiglare Layers 101 to 114 was blacked out with a black marker, and the state of disturbing reflection of light when reflecting light of a fluorescent lamp on the film surface was evaluated.

A: The figure of the fluorescent lamp was not recognized.

B: The figure of the fluorescent lamp was slightly reflected but not annoying.

C: The figure of the fluorescent lamp was clearly reflected and was glaring and annoying.

The level of B or higher was judged as passed.

(Curling)

The curling of the produced antiglare film was measured using a template for curl measurement in Method A of "Curl Measurement Method for Photographic Film" of JIS-K7619-1988.

The measurement conditions were 25° C., a relative humidity of 60% and a humidity conditioning time of 10 hours, and the curling was rated C when the curl value by the following mathematical formula was −15 or less and +15 or more, rated B when from −15 to −10 and from +10 to +15, and rated A when from −10 to +10. The level of B or higher was judged as passed. At this time, the direction along which curling in the sample was measured is the substrate conveying direction in the case of web-form coating.

(Mathematical Formula)

Curl=1/$R$ ($R$: radius of curvature ($m$))

The evaluation results are shown in Table 1.

particle diameter of the light-transmitting fine particle and where the antiglare layer contains the light-transmitting fine particle in an amount of 1.0 to 3.0 weight % based on all solid contents forming the antiglare layer, disturbing reflection and curling are little caused and the point defect by a coarse particle of the light-transmitting fine particle is difficultly visible.

Example 2

(Coating of Medium, High and Low Refractive Index Layers)
(Preparation of Coating Solution A for Medium Refractive Index Layer)

3.0 Parts by weight of a mixture of dipentaerythritol pentaacrylate and dipentaerythritol hexaacrylate (DPHA), 0.1 parts by weight of a photopolymerization initiator (IRGACURE 184, produced by Ciba Specialty Chemicals Corp.), 86.9 parts by weight of methyl isobutyl ketone and 0.1 parts by weight of SP-13 were added to 10.0 parts by weight of a $ZrO_2$ fine particle-containing hardcoat agent (DESOLITE Z7404 [refractive index: 1.72, solid content concentration: 60 weight %, zirconium oxide fine particle content: 70 weight % (based on solid content), average particle diameter of zirconium oxide fine particle: about 20 nm, solvent composition: MIBK/MEK=9/1, produced by JSR Corp.]), and the resulting mixture was stirred. After well stirring, the obtained solution was filtered through a polypropylene-made filter having a pore size of 0.4 μm to prepare Coating Solution A for Medium Refractive Index Layer. The refractive index after curing of the medium refractive index layer obtained by coating and curing the coating solution above was 1.62.

(Preparation of Coating Solution B for Medium Refractive Index Layer)

5.0 Parts by weight of an acrylic acid adduct of bisphenol A diglycidyl ether (VR-77, produced by Showa Highpolymer Co., Ltd.), 5.23 parts by weight of a $ZrO_2$ fine particle-containing hardcoat agent (DESOLITE Z7404 [refractive index:

TABLE 1

| Antiglare Layer No. | Diameter of Light-Transmitting Particle (μm) | Content of Light-Transmitting Particle (weight %) | Thickness (μm) | Ra (μm) | Rz (μm) | Sm (mm) | θ(1) (%) | Point Defect | Disturbing Reflection | Curling | Remarks |
|---|---|---|---|---|---|---|---|---|---|---|---|
| 101 | 1.5 | 2 | 1.2 | 0.06 | 0.20 | 0.25 | 94.5 | C | C | A | Comparative Example |
| 102 | 6 | 2 | 4.7 | 0.10 | 0.43 | 0.11 | 86.7 | A | B | A | Invention |
| 103 | 3 | 2 | 2 | 0.09 | 0.41 | 0.07 | 91.9 | A | A | A | Invention |
| 104 | 15 | 2 | 13.5 | 0.18 | 0.72 | 0.38 | 83.4 | A | A | A | Invention |
| 105 | 8 | 2 | 6.5 | 0.13 | 0.48 | 0.1 | 85.1 | A | A | A | Invention |
| 106 | 20 | 2 | 18.5 | 0.15 | 1.04 | 0.45 | 84.6 | A | A | C | Comparative Example |
| 107 | 6 | 0.05 | 4.7 | 0.05 | 0.28 | 0.29 | 96.8 | C | C | A | Comparative Example |
| 108 | 6 | 1 | 4.7 | 0.06 | 0.35 | 0.17 | 92.1 | A | B | A | Invention |
| 109 | 6 | 2.5 | 4.7 | 0.11 | 0.43 | 0.05 | 86.7 | A | A | A | Invention |
| 110 | 6 | 4 | 4.7 | 0.16 | 1.18 | 0.02 | 58.2 | C | A | A | Comparative Example |
| 111 | 6 | 2 | 3 | 0.22 | 1.79 | 0.08 | 68.9 | C | A | A | Comparative Example |
| 112 | 6 | 2 | 6 | 0.05 | 0.18 | — | 98.8 | C | C | A | Comparative Example |
| 113 | 6 | 2 | 11 | 0.03 | 0.11 | — | 98.9 | A | C | A | Comparative Example |
| 114 | 6 | 2.5 | 4.7 | 0.12 | 0.47 | 0.05 | 83.7 | A | A | A | Invention |

It is understood from the results above that in the antiglare film where the average particle diameter of the light-transmitting fine particle is from 3 to 15 μm and the average thickness of the antiglare layer is smaller than the average 1.72, solid content concentration: 60 weight %, zirconium oxide fine particle content: 70 weight % (based on solid content), average particle diameter of zirconium oxide fine particle: about 20 nm, solvent composition: MIBK/MEK=9/

1, produced by JSR Corp.]), 0.24 parts by weight of a photopolymerization initiator (IRGACURE 184, produced by Ciba Specialty Chemicals Corp.) and 117 parts by weight of methyl isobutyl ketone were added and stirred to prepare Coating Solution B for Medium Refractive Index Layer. The refractive index after curing of the medium refractive index layer obtained by coating and curing the coating solution above was 1.62.

(Preparation of Coating Solution A for High Refractive Index Layer)

85.0 Parts by weight of methyl ethyl ketone and 0.1 parts by weight of SP-13 were added to 15.0 parts by weight of a $ZrO_2$ fine particle-containing hardcoat agent (DESOLITE Z7404 [refractive index: 1.72, solid content concentration: 60 weight %, zirconium oxide fine particle content: 70 weight % (based on solid content), average particle diameter of zirconium oxide fine particle: about 20 nm, solvent composition: MIBK/MEK=9/1, produced by JSR Corp.]), and the resulting mixture was stirred. The obtained solution was filtered through a polypropylene-made filter having a pore size of 0.4 μm to prepare Coating Solution A for High Refractive Index Layer. The refractive index after curing of the high refractive index layer obtained by coating and curing the coating solution above was 1.72.

(Preparation of Coating Solution A for Low Refractive Index Layer)

20 Parts of acryloyloxypropyltrimethoxysilane and 1.5 parts of diisopropoxyaluminum ethyl acetate were added to 500 parts of a hollow silica fine particle sol (isopropyl alcohol silica sol, CS60-IPA, produced by Catalysts & Chemicals Ind. Co., Ltd., average particle diameter: 60 nm, thickness of shell: 10 nm, silica concentration: 20%, refractive index of silica particle: 1.31) and mixed, and 9 parts of ion-exchanged water was added thereto. After allowing the reaction to proceed at 60° C. for 8 hours, the reaction solution was cooled to room temperature, and 1.8 parts of acetyl acetone was added to obtain a liquid dispersion. Thereafter, solvent replacement by reduced-pressure distillation was performed under a pressure of 30 Torr while adding cyclohexanone to keep almost constant the silica content, and after adjustment of the concentration, a liquid dispersion having a solid content concentration of 18.2% was finally obtained. The amount of IPA remaining in the obtained hollow silica particle liquid dispersion was analyzed by gas chromatography and found to be 0.5% or less.

Using the obtained hollow silica particle liquid dispersion, Coating Solution A for Low Refractive Index Layer of the following formulation was prepared. The refractive index after curing of the low refractive index layer obtained by coating and curing the coating solution above was 1.36.

Formulation of Coating Solution A for Low Refractive Index Layer:

| | |
|---|---|
| DPHA | 1.0 parts by weight |
| P-1 | 1.6 parts by weight |
| Hollow Silica Particle Liquid Dispersion (18.2%) | 26.4 parts by weight |
| RMS-033 | 0.4 parts by weight |
| IRGACURE 907 | 0.3 parts by weight |
| M-1 | 1.9 parts by weight |
| MEK | 168.4 parts by weight |

P-1:

Fluorine-Containing Copolymer P-3 (weight average molecular weight: about 50,000) described in JP-A-2004-45462

DPHA:

A mixture of dipentaerythritol pentaacrylate and dipentaerythritol hexaacrylate, produced by Nippon Kayaku Co., Ltd.

IRGACURE 907:

Polymerization initiator (produced by Ciba-Geigy Corp.)

M-1:

Fluorine-Containing Acrylate M-1 set forth in JP-A-2006-28280

RMS-033:

Methacryloxy-modified silicone (produced by Gelest)

The coating solution for medium refractive index layer, the coating solution for high refractive index layer and the coating solution for low refractive index layer were directly extruded using a coater having a throttle die and coated to give a construction shown in Table 2. As for the amount of the coating solution for each layer, the liquid amount giving a desired thickness when coating the coating solution on a PET film was also applied as it is to the layers on the antiglare layer. The thickness on the PET film is shown in Table 2 as the actual thickness on the antiglare layer. The thickness on the PET was calculated using a spectral reflectance thickness monitor "FE-3000" (manufactured by Otsuka Electronics Co., Ltd.).

TABLE 2

| Sample No. | Antiglare Layer No. | Light-Transmitting Particle Diameter (μm) | Light-Transmitting Particle Content (weight %) | Thickness (μm) | Medium Refractive Index Layer Coating Solution | Medium Refractive Index Layer Thickness (nm) | High Refractive Index Layer Coating Solution | High Refractive Index Layer Thickness (nm) | Low Refractive Index Layer Coating Solution | Low Refractive Index Layer Thickness (nm) | Remarks |
|---|---|---|---|---|---|---|---|---|---|---|---|
| 1 | 101 | 1.5 | 2 | 1.2 | — | — | — | — | A | 90 | Comparative Example |
| 2 | 102 | 6 | 2 | 4.7 | — | — | — | — | A | 90 | Invention |
| 3 | 101 | 1.5 | 2 | 1.2 | — | — | A | 170 | A | 90 | Comparative Example |
| 4 | 102 | 6 | 2 | 4.7 | — | — | A | 170 | A | 90 | Invention |
| 5 | 101 | 1.5 | 2 | 1.2 | A | 60 | A | 112 | A | 90 | Comparative Example |
| 6 | 103 | 3 | 2 | 2 | A | 60 | A | 112 | A | 90 | Invention |
| 7 | 104 | 15 | 2 | 13.5 | A | 60 | A | 112 | A | 90 | Invention |
| 8 | 102 | 6 | 2 | 4.7 | A | 60 | A | 112 | A | 90 | Invention |
| 9 | 105 | 8 | 2 | 6.5 | A | 60 | A | 112 | A | 90 | Invention |
| 10 | 106 | 20 | 2 | 18.5 | A | 60 | A | 112 | A | 90 | Comparative Example |

TABLE 2-continued

| Sample No. | Anti-glare Layer No. | Light-Transmitting Particle Diameter (μm) | Light-Transmitting Particle Content (weight %) | Thickness (μm) | Medium Refractive Index Layer Coating Solution | Medium Refractive Index Layer Thickness (nm) | High Refractive Index Layer Coating Solution | High Refractive Index Layer Thickness (nm) | Low Refractive Index Layer Coating Solution | Low Refractive Index Layer Thickness (nm) | Remarks |
|---|---|---|---|---|---|---|---|---|---|---|---|
| 11 | 107 | 6 | 0.05 | 4.7 | A | 60 | A | 112 | A | 90 | Comparative Example |
| 12 | 108 | 6 | 1 | 4.7 | A | 60 | A | 112 | A | 90 | Invention |
| 13 | 109 | 6 | 2.5 | 4.7 | A | 60 | A | 112 | A | 90 | Invention |
| 14 | 110 | 6 | 4 | 4.7 | A | 60 | A | 112 | A | 90 | Comparative Example |
| 15 | 111 | 6 | 2 | 3 | A | 60 | A | 112 | A | 90 | Comparative Example |
| 16 | 112 | 6 | 2 | 6 | A | 60 | A | 112 | A | 90 | Comparative Example |
| 17 | 113 | 6 | 2 | 11 | A | 60 | A | 112 | A | 90 | Comparative Example |
| 18 | 114 | 6 | 2.5 | 4.7 | A | 60 | A | 112 | A | 90 | Invention |
| 19 | 102 | 6 | 2 | 4.7 | B | 60 | A | 112 | A | 90 | Invention |

The drying conditions of the medium refractive index layer were 90° C. and 30 seconds, and the ultraviolet curing conditions were such that an air-cooled metal halide lamp (manufactured by Eye Graphics Co., Ltd.) of 180 W/cm was used at an illuminance of 400 mW/cm$^2$ and an irradiation dose of 240 mJ/cm$^2$ while purging the system with nitrogen to give an atmosphere having an oxygen concentration of 1.0 vol % or less.

The drying conditions of the high refractive index layer were 90° C. and 30 seconds, and the ultraviolet curing conditions were such that an air-cooled metal halide lamp (manufactured by Eye Graphics Co., Ltd.) of 240 W/cm was used at an illuminance of 400 mW/cm$^2$ and an irradiation dose of 240 mJ/cm$^2$ while purging the system with nitrogen to give an atmosphere having an oxygen concentration of 1.0 vol % or less.

The drying conditions of the low refractive index layer were 60° C. and 60 seconds, and the ultraviolet curing conditions were such that an air-cooled metal halide lamp (manufactured by Eye Graphics Co., Ltd.) of 240 W/cm was used at an illuminance of 600 mW/cm$^2$ and an irradiation dose of 600 mJ/cm$^2$ while purging the system with nitrogen to give an atmosphere having an oxygen concentration of 0.1 vol % or less.

(Evaluation of Antireflection Film)

Various properties of the antireflection film were evaluated by the following methods. The results are shown in Table 3.

(Integrated Reflectance)

The back surface (surface on the side opposite the low refractive index layer) of the antireflection films of Samples 1 to 19 was roughened with sand paper and then treated with black ink to provide a state of the reflection on the back surface being eliminated. The front surface of the antireflection film was loaded to an integrating sphere of a spectrophotometer V-550 (manufactured by JASCO Corporation), and the reflectance (integrated reflectance) was measured in the wavelength region of 380 to 780 nm. The average (average reflectance) of the integrated reflectance at 450 to 650 nm was calculated, and the antireflection property was evaluated by the value obtained.

(Denseness of Black at Black Display <Display Performance>)

A polarizer was produced by adsorbing iodine to a stretched polyvinyl alcohol film. Antireflection Films of Samples 1 to 19 each was saponified and laminated to one side of the polarizer by using a polyvinyl alcohol-based adhesive such that the cellulose triacetate side of each antireflection film came to the polarizer side. Also, a commercially available cellulose triacetate film "FUJITAC TD80UF" {produced by Fujifilm Corp.} was laminated to the polarizer surface opposite the side where the antireflection film was laminated, by using a polyvinyl alcohol-based adhesive. In this way, Polarizing Plates (HKH-01) to (HKH-19) with antireflection film were produced.

The polarizing plate on the viewing side of a 32-type full-spec high vision liquid crystal TV "LC-32GS10" {manufactured by Sharp Corp., pixel size: 370 μm} was removed, and Polarizing Plates (HKH-01) to (HKH-19) each was laminated instead to the viewing side through an adhesive such that the antireflection film came to the outmost surface. The panel was driven in black display under a general home environment (about 200 Lx) using TV, and the white brownish tint was confirmed with an eye. In the criteria for visual evaluation, A is when the degree of black was very good, B is when the degree of black intensity was good, and C is when white brownish tint is generated. The level of B or higher was judged as "passed".

(Disturbing Reflection)

After blacking out the back surface of the films of Samples 1 to 19 by a black marker, light of a fluorescent lamp was reflected on the front surface of the film and the disturbing reflection of light was evaluated.

A: Reflection of light was sufficiently suppressed or light was satisfactorily diffused and not annoying.

B: The figure of the fluorescent lamp threw disturbing reflection but was not annoying.

C: The figure of the fluorescent lamp clearly threw disturbing reflection and was glaring and annoying.

The level of B or higher was judged as "passed".

(Pencil Hardness)

The pencil hardness of the produced antireflection film was evaluated by a pencil hardness test in accordance with JIS-K5400.

The sample was rated A when the pencil hardness was 3H or more, rated B when 2H, and C when H or less. The level of B or higher was judged as "passed".

(Curling)

The curling of the produced antireflection film was measured using a template for curl measurement in Method A of "Curl Measurement Method for Photographic Film" of JIS-K7619-1988.

The measurement conditions were 25° C., a relative humidity of 60% and a humidity conditioning time of 10 hours, and the curling was rated C when the curl value by the following mathematical formula was −15 or less and +15 or more, rated B when from −15 to −10 and from +10 to +15, and rated A when from −10 to +10. The level of B or higher was judged as "passed". At this time, the direction along which curling in the sample was measured is the substrate conveying direction in the case of web-form coating.
(Mathematical Formula)

Curl=1/R(R: radius of curvature (m))

The evaluation results are shown in Table 3.

TABLE 3

| Sample No. | Integrated Reflectance (%) | Denseness of Black | Disturbing Reflection | Pencil Hardness | Curling | Remarks |
|---|---|---|---|---|---|---|
| 1 | 1.6 | A | C | C | A | Comparative Example |
| 2 | 1.75 | B | B | A | A | Invention |
| 3 | 1.35 | A | C | C | A | Comparative Example |
| 4 | 1.44 | A | A | A | A | Invention |
| 5 | 0.75 | A | B | C | A | Comparative Example |
| 6 | 0.86 | A | A | B | A | Invention |
| 7 | 0.97 | B | A | A | A | Invention |
| 8 | 0.94 | A | A | A | A | Invention |
| 9 | 0.95 | A | A | A | A | Invention |
| 10 | 0.95 | A | A | A | C | Comparative Example |
| 11 | 0.78 | A | C | A | A | Comparative Example |
| 12 | 0.83 | A | B | A | A | Invention |
| 13 | 0.95 | A | A | A | A | Invention |
| 14 | 1.25 | C | A | A | A | Comparative Example |
| 15 | 1.13 | C | A | B | A | Comparative Example |
| 16 | 0.64 | A | C | A | A | Comparative Example |
| 17 | 0.63 | A | C | A | A | Comparative Example |
| 18 | 0.99 | B | A | A | A | Invention |
| 19 | 0.92 | A | A | A | A | Invention |

It is seen from the results above that in an antiglare film where the average particle diameter of the light-transmitting fine particle is from 3 to 15 μm and the average thickness of the antiglare layer is smaller than the average particle diameter of the light-transmitting fine particle by 0.1 to 2.0 μm and where the antiglare layer contains the light-transmitting fine particle in an amount of 1.0 to 3.0 weight % based on all solid contents forming the antiglare layer, surprisingly, the film has irregularities in the surface and maintains the antiglare property and even when a low refractive index layer is stacked, the integrated reflectance is 2.0% or less, revealing antireflection properties with good denseness of black and successful prevention of disturbing reflection. Furthermore, when two or more interference layers are stacked, the integrated reflectance becomes 1.5% or less and it is revealed that antireflection properties with higher denseness of black and more successful prevention of disturbing reflection can be obtained.

Example 3

Each film of Samples 1 to 19 and a 80 μm-thick triacetyl cellulose film (TAC-TD80U, produced by Fujifilm Corp.) were dipped in an aqueous 1.5 mol/liter NaOH solution at 55° C. for 2 minutes, neutralized and then washed with water. Each saponified film of Samples 1 to 19 and the saponified 80 μm-thick triacetyl cellulose film (TAC-TD80U, produced by Fujifilm Corp.) were respectively adhered to and caused to protect both surfaces of a polarizer produced by adsorbing iodine to polyvinyl alcohol and stretching the film, whereby a polarizing plate was produced. The thus-produced polarizing plate was laminated instead of the polarizing plate on the viewing side of a liquid crystal display device (where D-BEF produced by Sumitomo 3M Ltd., which is a polarizing separation film having a polarization selective layer, is provided between the backlight and the liquid crystal cell) of a note-type personal computer having mounted therein a transmissive TN liquid crystal display device, such that the low refractive index layer became the outermost surface. As a result, a display device with extremely reduced disturbing reflection of surrounding scene and very high display quality was obtained. Also, in the display device having the film sample of the present invention, a point defect could not be visually perceived.

Example 4

Each film of the samples of the present invention produced was laminated to a glass plate on the surface of an organic EL display device through an adhesive, as a result, a display device reduced in the reflection on the glass surface and assured of high visibility was obtained. Also, in the display device having the sample of the present invention, a point defect could not be visually perceived.

Example 5

A polarizing plate having the film of the present invention on one surface was produced by using each film of the samples of the present invention produced in Example 1, a λ/4 plate was laminated on the polarizing plate surface opposite the side having the film of the present invention, and the resulting polarizing plate was laminated to a glass plate on the surface of an organic EL display device by arranging the side having the film of the present invention to become the outermost surface, as a result, surface reflection and reflection from the inside of the surface glass were cut and a display with remarkably high visibility was obtained. Also, in the display device having the film sample of the present invention, a point defect could not be visually perceived.

What is claimed is:
1. An antiglare film comprising:
a transparent support; and
an antiglare layer containing a binder and a light-transmitting fine particle,
wherein
the light-transmitting fine particle has an average particle diameter of 3 to 15 μm,
the antiglare layer has an average thickness smaller than the average particle diameter of the light-transmitting fine particle by 0.1 to 2.0 μm,
the antiglare layer contains the light-transmitting fine particle in an amount of 1.0 to 3.0 weight % based on all solid contents of the antiglare layer, and
the antiglare layer has a surface having a θ(1) of 60 to 98.5%, wherein the θ(1) is a ratio of a surface region of 0°≦θ≦1° in the surface when θ represents a tilt angle of an irregularity on the surface.
2. The antiglare film according to claim 1, wherein the surface of the antiglare layer has irregularities having an average distance Sm of 0.03 mm<Sm<0.5 mm.

3. The antiglare film according to claim 1, wherein the surface of the antiglare layer has a 10-point average roughness Rz of $0.2\ \mu m<Rz<2.0\ \mu m$.

4. The antiglare film according to claim 1, wherein the antiglare layer contains a leveling agent of a fluorine-containing compound or a silicone compound.

5. An antireflection film comprising:
an antiglare film according to claim 1; and
a low refractive index layer having a refractive index lower than the antiglare layer.

6. The antireflection film according to claim 5, wherein the low refractive index layer contains a hollow silica particle.

7. The antireflection film according to claim 5, further comprising a high refractive index layer having a refractive index higher than both the antiglare layer and the low refractive index layer, the high refractive index layer being between the antiglare layer and the low refractive index layer.

8. The antireflection film according to claim 7, wherein the high refractive index layer contains an oxide fine particle of at least one metal selected from the group consisting of Si, Al, Ti, Zr, Sb, Zn, Sn and In.

9. The antireflection film according to claim 8, wherein the high refractive index layer contains the oxide fine particle in an amount of 30 weight % or more based on all solid contents of the high refractive index layer.

10. The antireflection film according to claim 7, wherein the high refractive index layer contains a leveling agent of a fluorine-containing compound or a silicone compound.

11. The antireflection film according to claim 7, further comprising a medium refractive index layer having a refractive index layer higher than the antiglare layer and lower than the high refractive index layer, the medium refractive index layer being between the antiglare layer and the high refractive index layer.

12. The antireflection film according to claim 11, wherein the medium refractive index layer contains an oxide fine particle of at least one metal selected from the group consisting of Si, Al, Ti, Zr, Sb, Zn, Sn and In.

13. The antireflection film as claimed in claim 12, wherein the medium refractive index layer contains the oxide fine particle in an amount of 30 weight % or more based on all solid contents of the medium refractive index layer.

14. The antireflection film according to claim 11, wherein the medium refractive index layer contains a leveling agent of a fluorine-containing compound or a silicone compound.

15. A polarizing plate comprising: a polarizer; and protective films on respective sides of the polarizer, wherein at least one of the protective films is an antiglare film according to claim 1.

16. An image display device comprising an antiglare film according to claim 1 on an image display surface thereof.

\* \* \* \* \*